United States Patent [19]

Woollenweber

[11] Patent Number: 4,641,977
[45] Date of Patent: Feb. 10, 1987

[54] BEARING SYSTEM

[76] Inventor: William E. Woollenweber, 3905 Cove Rd., Columbus, Ind. 47203

[21] Appl. No.: 711,245

[22] PCT Filed: Mar. 21, 1984

[86] PCT No.: PCT/US84/00439
§ 371 Date: Dec. 11, 1984
§ 102(e) Date: Dec. 11, 1984

[87] PCT Pub. No.: WO84/04141
PCT Pub. Date: Oct. 25, 1984

[51] Int. Cl.⁴ .................. F16C 21/00; F16C 33/58
[52] U.S. Cl. .................. 384/99; 384/101; 384/126; 384/287; 384/512; 384/513; 384/901
[58] Field of Search .......... 184/6.11; 417/407; 415/110, 111, 112, 170; 308/DIG. 4, DIG. 15; 384/126, 127, 128, 397, 398, 99, 286, 287, 473, 474, 615, 609, 462, 513, 901, 512, 101

[56] References Cited

U.S. PATENT DOCUMENTS

| 3,043,636 | 7/1962  | MacInnes et al. | 384/287 |
| 3,056,634 | 10/1962 | Woollenweber, Jr. et al. | 384/287 |
| 3,058,787 | 10/1962 | Bernson | 384/287 |
| 3,068,638 | 12/1962 | Birmann | 60/13 |
| 3,096,126 | 7/1963  | Woollenweber, Jr. et al. | 384/114 |
| 3,218,029 | 11/1965 | Woollenweber, Jr. | 253/55 |
| 3,270,495 | 9/1966  | Connor | 60/13 |
| 3,292,092 | 12/1966 | Germann | 328/179 |
| 3,292,364 | 12/1966 | Cazier | 60/13 |
| 3,383,092 | 5/1968  | Cazier | 253/40 |
| 3,390,926 | 7/1968  | Woollenweber, Jr. | 384/287 |
| 3,408,046 | 10/1968 | Woollenweber, Jr. | 253/55 |
| 3,423,926 | 1/1969  | Nancarrow et al. | 60/13 |
| 3,614,259 | 10/1971 | Neff | 415/205 |
| 3,811,741 | 5/1974  | McIrney et al. | 384/291 |
| 3,930,747 | 1/1976  | Woollenweber | 415/205 |
| 3,993,370 | 11/1976 | Woollenweber | 384/287 |
| 4,169,354 | 10/1979 | Woollenweber | 60/600 |
| 4,370,106 | 1/1983  | Lauterbach | 417/407 |

Primary Examiner—Stuart S. Levy
Assistant Examiner—David Werner
Attorney, Agent, or Firm—Willian Brinks Olds Hofer Gilson & Lione

[57] ABSTRACT

A bearing system for a high-speed, rotating shaft (20) includes an outer race (12) adapted to be rotatable in its machine support and (32) to carry a rolling bearing (16), such as a ball bearing, at one end and further includes a floating sleeve bearing (14) at the other end. The outer race of the system can be adapted to rotate on a film of lubricant at a speed less than one-third, and preferably about one-tenth, that of the rotating shaft. The bearing system can include thrust-bearing surfaces (12c, 12d) at one end of the outer race and surfaces to permit lubrication of the sleeve and rolling bearings. The floating sleeve bearing is free to rotate at speeds of about one-half the speed of the rotating shaft. The system thus can provide very low bearing losses and a long bearing life. Such a system can be particularly adapted to provide an insertable bearing support for the rotating shaft of a turbocharger and to position the sleeve bearing adjacent the turbine (34) and the rolling bearing adjacent the compressor (36).

26 Claims, 3 Drawing Figures

BEARING SYSTEM

TECHNICAL FIELD

This invention relates to bearing systems for shafts that rotate at high speeds, and more particularly to bearing systems applicable to machines with shafts that rotate at high speed and are exposed at one end to high temperatures, such as turbochargers for internal combustion engines.

BACKGROUND ART

It is desirable to provide, in high-speed machinery, anti-friction rolling bearings, such as ball bearings or roller bearings, to reduce friction and permit high-rotational speeds with low-energy loss. However, in machines having shaft-rotating speeds on the order of 60,000 or 80,000 rpm, such bearings have a limited life on the order of 500 hours. Such a limited life is not acceptable in many commercial applications and, particularly, in applications such as the turbochargers for internal combustion engines.

Turbochargers for internal combustion engines are now widely used in conventional automobiles, and bearing systems, particularly as adapted for use in turbochargers, must be capable of mass-production methods and must be economical to manufacture and service. In addition, such bearing systems must have a long life and must not be subject to breakdown at relatively short intervals such as 500 hours. Since anti-friction bearings such as roller bearings and ball bearings are expensive and have too short an operating life for commercial use in automotive turbochargers, it has been conventional practice to provide sleeve bearings in such applications.

Conventional sleeve bearings have been found objectionable in these applications because they would not tolerate a practical degree of imbalance in their supported rotating parts and because they were incapable of damping resonant vibrations of the rotating parts due to such imbalance. Instead of rotating about a stationary center, unbalanced high-speed, rotating shafts have a tendency to whirl about in such a manner that their centers travel through a circular or modified circular path. Conventional bearing clearances limit such a whirling motion; but at speeds on the order of 80,000 rpm or more, metal-to-metal contact and rapid wear of the bearings occur as a result of oil film breakdown due to lubricating oil film dynamics and bearing loads.

A number of prior bearings have resulted from these problems. Among the patents disclosing bearings resulting from such problems, are prior U.S. Pat. Nos. 3,056,634; 3,096,126; 3,390,926; and 3,993,370. These patents are directed to bearings to provide stability at high speed with the ability to absorb vibration and shock load of the type experienced by bearing systems, for example, in turbochargers, and to be manufactured at low cost. The bearings of the patents above generally solved the stability problem by the use of a free-floating bushing between the rotating shaft and its stationary supporting member which was adapted to provide a film of lubrication between its inner surface and the rotating shaft and between its outer surface and the stationary supporting member. In these systems, the free-floating bushing was free to rotate, but at speeds substantially less than the rotating shaft and was free to move radially in response to imbalance experienced by the rotating shaft. The freedom of radial movement permitted the rotating shaft to rotate about its center of mass and the inner and outer oil films provided the necessary lubrication and cushion against vibration and shock loads. The problem of "oil whirl" where the pressures in the film of lubrication go to zero and the shaft contacts the bearing surface was solved.

The bearings of these patents also provided thrust-bearing surfaces as, for example, in U.S. Pat. No. 3,390,926 and employed the increased frictional drag at the outer bushing surface to reduce the rotational speed of the bushing to a fraction of the rotating shaft speed and passageways in the bearings themselves to direct oil from the outer surface to the inner surfaces and thrust-bearing surfaces.

U.S. Pat. No. 4,370,106 suggests a bearing system for a turbocharger rotor, including an anti-friction ball bearing at its compressor end and a sleeve bearing at its turbine end. This bearing system, however, includes a non-rotating sleeve that forms a non-rotating sleeve bearing at the turbine end of the rotor and an integral non-rotating support for the outer race of the anti-friction ball bearing at the compressor end of the rotor. The sleeve and bearing system is prevented from rotating by a square or out-of-round portion at the compressor end that is mechanically engaged with the turbocharger housing. Lubricant is provided between the stationary sleeve and the supporting housing to provide resilience and damping for eccentric motion of the rotor due to its imbalance. In this bearing system, however, the differential speed between the sleeve bearing and rotor is the full rotative speed of the rotor. Since the bearing losses are proportional to the square of the rotative speed, this system was a high loss compared with a floating bearing system. In addition, since the non-rotating sleeve must bear against the stationary housing with the full thrust load of the rotor. The imbalance in the rotor forces the non-rotating sleeve to move orbitally, causing the surfaces to be subject to fretting. Thus, a stationary solid film lubricant must be provided to lessen the fretting problem. However, the problem is still inherent with this non-rotating sleeve system and contributes to a reduced service life in the field.

Other patents directed to bearings intended to solve the stability problem are U.S. Pat. Nos. 3,043,636 and 3,811,741; but the bearings of these systems have substantial hydrodynamic losses associated with the bearings which reduce the efficiency of a turbocharger.

DISCLOSURE OF THE INVENTION

The bearing system of this invention provides a reliable, stable, shock- and vibration-resistant, highly efficient, simple, and economical bearing system that is insertable and, thus, permits inexpensive manufacture, maintenance, and repair of the machines in which it is used.

This system introduces reliable, anti-friction rolling bearings into such applications and comprises basically an elongated outer race adapted to be rotatable in its support and to provide an anti-friction rolling bearing and cooperate with a full-floating sleeve to carry the rotating shaft. The sleeve bearing may be located by the bearing system within machines such as turbochargers at the end of the machine exposed to high temperature, such as that of a gas passing through a turbine; and the rolling bearing may be located by the system at the cooler end of the machine, for example, adjacent a turbocharger compressor. The system may be adapted to be insertable into a stationary machine element and to support the shaft rotatably at two-spaced locations. The outer race of the system has preferably an elongated, cylindrical, outer bearing surface adapted to be carried rotatably on a film of lubricant at its interface with the stationary machine element. Such a preferable outer race and the full-floating sleeve bearing can include passageways to provide a flow of lubrication to the interface between the sleeve bearing and the rotating shaft. The inner surface of the outer race can have an expanding diameter to provide a flow of lubricant from the sleeve bearing to the elements of the rolling bearing.

The end of the system adjacent the rolling bearing may be provided with outwardly projecting surfaces, generally transverse to the axis of rotation, to form thrust bearings that may thus be located adjacent the cooler end of a machine. In the preferable bearing system of this invention, lubricating fluid provided to the outer bearing surface of the outer race also lubricates one of the outwardly and traversely projecting thrust-bearing surfaces; and lubricating fluid provided to the inner surface of the sleeve bearing also lubricates the rolling elements of the anti-friction bearing and, upon leaving the anti-friction bearing, can lubricate the other outwardly and traversely projecting thrust-bearing surface.

The bearing system is sized with regard to the stationary machine element into which it fits so that it may be easily inserted within the stationary machine element and over the rotating shaft and be free to move radially on films of lubrication in response to imbalance of the mass carried by the rotating shaft.

BEST MODE FOR CARRYING OUT THE INVENTION

Figure 1:
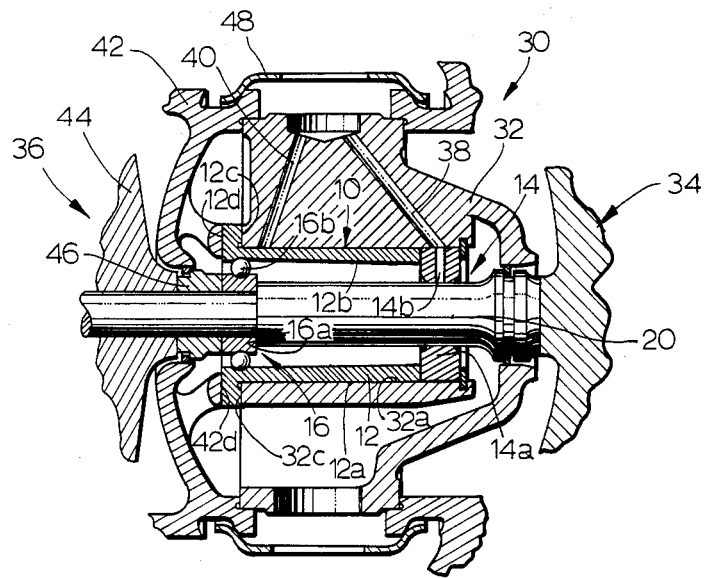
FIG. 1 is a cross-sectional view taken along a plane through the axis of rotation of a bearing system of this invention.

As shown in FIG. 1, the bearing system of this invention 10 is adapted to support a high-speed, rotating shaft 20 within the stationary elements of a machine 30. The new bearing system comprises an outer race 12 adapted to be rotatable in its supporting stationary machine element 32 and to cooperate with a full-floating sleeve bearing 14 at one end and a rolling bearing 16 at the other end. The machine 30, as shown in FIG. 1, may be, for example, a turbocharger for an internal combustion engine, including a turbine 34 at one end and a compressor 36 at the other end. The bearing system locates the sleeve bearing 14 adjacent the hot end of the machine, that is, adjacent the turbine 34, and locates the rolling bearing 16 adjacent the cooler end of the machine, that is, adjacent the compressor 36.

As shown in FIG. 1, the full-floating sleeve bearing 14 may be of a conventional type, commonly used in turbochargers. The roller bearing 16 comprises an inner race 16a and a plurality of rolling elements 16b interposed between shaft 20 and outer race 12.

The outer race 12 can be machined on its interior surface to cooperate with the inner race 16a and a plurality of rolling elements 16b to provide an anti-friction bearing at the end opposite the sleeve bearing 14. The outer race 12 can carry a conventional rolling bearing as shown, for example, in FIG. 3. The outer race 12 includes an outer bearing surface 12a adapted to be rotatably carried within the inner bearing surface 32a of stationary support element 32. The inner surface 12b of the outer race expands from the end adjacent the sleeve bearing to the end forming the roller bearing 14 to provide a flow of lubrication to the rolling elements 16b of the rolling bearing 16. The outer surface of the outer race may also provide a thrust bearing. Such a thrust bearing may be provided by a pair of outwardly projecting surfaces 12c and 12d projecting transversely of the axis of rotation from the outer surface of the outer race 12. Preferably surfaces 12c and 12d are a pair of spaced and parallel surfaces that lie normal to the axis of rotation of the rotating system, but it is not necessary that the thrust-bearing surfaces lie normal to the axis of rotation or be parallel. In addition, the surface 12d may be formed by only that portion of the outer race lying next adjacent the rolling elements 16b.

In the invention, the entire bearing system 10 is free to rotate in the stationary machine element 32. As shown in FIG. 1, lubricating fluid (such as oil) is introduced into passageways 38 and 40 in the stationary machine element 32. Such lubricating fluid flows through the passageways 38 and 40 to the interface between the stationary machine element 32 and the outer race 12 of the bearing system. The lubricating film clearance between the outer race 12 and the stationary machine element 32 is on the order of about 0.0051 cm. to about 0.0102 cm. As shown in FIG. 1, the sleeve bearing 14a includes a passageway 14b communicating with passageway 38 to provide a flow of lubrication to the inner bearing surface of the sleeve bearing 14. The oil film clearance between sleeve 14 and the rotating shaft 20 is on the order of about 0.0025 cm. to about 0.0051 cm.

As shown in FIG. 1, bearing system 10 may be inserted into the machine 30 with the compressor 36 removed, that is, with the end housing 42 and compressor wheel 44 removed from machine 30. The insertion of the bearing system 10 into the machine 30 is accomplished by merely sliding the sleeve bearing 14 and anti-friction bearing over the compressor end of shaft 20 with sleeve bearing 14 preceding rolling bearing 16. With the clearances set forth above, the bearing system 10 may be placed in position between the rotating shaft 20 and the stationary machine element 32 of machine 30 with relative ease. The inner race 16a of rolling bearing 16 is clamped after such installation by the machine spacer element 46 as the compressor fan 44 is fastened to rotating shaft 20, and the inner race 16a will thus rotate with shaft 20. It is possible to extend inner race 16a and to omit spacer element 46 in many systems.

Where the machine 30 is a machine such as a turbocharger having at one end high temperatures such as those of its gas turbine which is exposed to hot exhaust gases, the rotating shaft 20 is heated and, thus, must expand axially in response to thermal expansion of the material from which it is made. In the bearing system of this invention, thrust-bearing surfaces are provided adjacent the rolling bearing at the cooler end of the machine; the sleeve bearing 14 is located at the hotter end of the machine; and the shaft 20 is free to expand through the sleeve bearing in response to the heat to which it is exposed.

The bearing system is also provided with thrust-bearings by surfaces 12c and 12d. As shown in FIG. 1, the stationary machine element 32 may be provided with a end surface 32c mating the outwardly projecting bearing surface 12c at the outer surface of the outer race 12 of the bearing system. In addition, the machine end housing 42 may be provided with a bearing surface 42d mating the outwardly projecting, thrust-bearing surface 12d of the outer race 12 of the bearing system. Upon insertion of the bearing system 10 into the machine 30, and as the end housing 42 is fastened to the machine, for example, by a peripheral fastener 48, a thrust bearing is formed between surfaces 12c and 12d of the outer race 12 and corresponding stationary surfaces 32c and 42d of the machine. The dimensions of the system are such that an end play or axial clearance between surfaces 12c and 12d of the outer race and surfaces 32c and 42d of the machine are on the order of about 0.0102 cm. to about 0.0204 cm. Referring now to FIG. 1, lubricating fluid, which is provided to the interface between the outer bearing surface 12a of the outer race and the inner bearing surface 32a of the stationary machine element through passageways 38 and 40, will flow between the thrust-bearing surface 12c and the corresponding surface of the stationary machine 32c to lubricate this thrust bearing.

The bearing system of the invention also permits lubricating fluid to lubricate the sleeve bearing, the rolling bearing, and the other thrust-bearing surface. Lubricating fluid through passageway 38, in addition to lubricating the interface between the outer surface 12a of outer race and the inner bearing surface 32a of the stationary element, will flow to passage 14b of the sleeve bearing 14. The lubricating fluid will thus form a film of lubrication between the rotating shaft 20 and the sleeve 12a. A portion of the lubrication for the sleeve bearing 12 will flow from the sleeve bearing in the direction of the rolling bearing 16. The lubricating fluid will be flung to and will flow over the inner surface 12b of the outer race 12 and provide a flow of lubrication to the rolling elements 16b of rolling bearing 16. Upon escape from the rolling bearing 16, the lubrication will flow into the interface between thrust-bearing surface 12d and the corresponding bearing face 42d of machine element 42 and thereby lubricate the other thrust bearing. If the flow of lubrication to the thrust bearing from sleeve bearing 14 is insufficient, an axial passageway may be formed from passageway 40 of the stationary element to and through that portion of the outer race 12 lying between 12c and 12d.

After the oil has left the bearing system, it will flow outwardly of the machine; for example, through the oil drain openings in the machine in a manner known.

Figure 2:
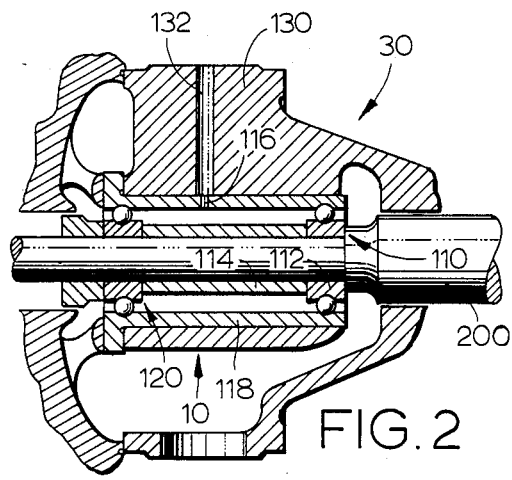
FIG. 2 is a cross-sectional view taken along the plane through the axis of rotation of another embodiment of the bearing system of this invention.

The bearing system of this invention may be used in machines in which the rotating shaft does not experience substantial thermal-expansion and may provide anti-friction bearings at each end of the bearing system, as shown in FIG. 2. In the system of FIG. 2, since no substantial expansion of the rotating shaft 200 is experienced, the bearing system 100 is provided with antifriction bearings 110 and 120 at each end. Differences between the bearing systems of FIG. 1 and FIG. 2 include: (a) the substitution of rolling bearing 110, its inner race 112 and spacer 114 for sleeve bearing 14, (b) the lubricating passageway 132 formed in stationary machine element 130, and (c) the position of the passageway for lubrication 116 formed in the outer race 118.

Figure 3:
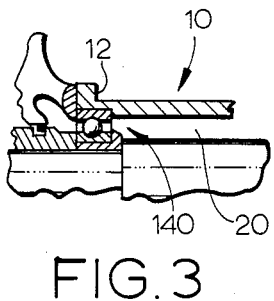
FIG. 3 is a partial cross-sectional view of a bearing system of this invention adapted to use conventional rolling bearings.

If it is desired to use conventional ball bearings for the rolling bearings 16 and 110 and 120 of the embodiments of FIGS. 1 or 2, they (e.g., 140) may be pressed into the outer races and the inner races of the bearing systems as shown in FIG. 3, or into the outer races so that their inner races form the inner race 16a of the bearing system.

In its embodiments, the bearing system of the invention is free to move radially in response to unbalanced conditions of the mass carried by the rotating shaft. Satisfactory stability is obtained if the outer race of the bearing system is allowed to rotate at about one-half the speed of the shaft, but it is preferable that the outer race rotate more slowly as the stability is enhanced at lesser fractions of the speed of the rotating shaft. With this invention, it is possible to limit the rotational speed of the outer race 12 to a range of from about one-third to about one-tenth of the rotating shaft's speed due to the frictional drag imposed by the elongated cylindrical bearing surfaces such as 12a and the thrust-bearing surfaces 12c and 12d of the preferred bearing system. Such rotation of the outer race lowers the relative speed between the rolling elements of the rolling bearing and the outer race, substantially enhancing the bearing life of the rolling bearing and substantially reducing the frictional losses associated with both the rolling bearing. It is believed the optimum ratio between the speed of the outer race and the speed of the rotational shaft is somewhat less than 0.1. The full-floating sleeve bearing 14 of the FIG. 1 embodiment will tend to rotate at a speed independent of the outer race 12 as a result of the thermal expansion of shaft 20 and the axial force imposed on sleeve bearing 14. In this embodiment, sleeve bearing 14 will rotate at speeds in the range of 0.4 to 0.5 times the speed of rotating shaft 20, thus substantially reducing the bearing losses and improving the life of the bearing system.

In its preferred embodiment, the outer surface 12a of the outer race 12 is preferably an elongated cylindrical bearing surface. Such a surface provides substantial frictional drag with respect to stationary machine element 32 and thus substantially reduces the relative speeds of rotation between the outer race 12 and the rolling elements 16b and between the rolling elements 16b and their inner race 16a. In addition, such a preferred embodiment provides substantial spacing between the sleeve bearing 14 and the rolling bearings 16 and permits a simple, insertable bearing system for the shaft 20.

Thus a bearing system of this invention provides a stable bearing system. The bearing system is free to move radially in response to imbalance in the rotating mass. In addition, the bearing system reduces the relative speeds of rotation between the shaft and the bearing system and between the bearing system and the stationary machine element, thereby eliminating the problems of oil whirl and improving the running life of the bearing system. Thrust loads may be taken at the cooler end of the machine while the shaft is free to expand in response to its exposure to heat through the sleeve bearing at the hot end of the machine. In the bearing system, the oil films cushion the rotating shaft against shock and vibration, provide adequate lubrication, carry away friction-generated heat from the bearing surfaces, and also tend to carry away heat carried down the shaft from the hot end of the machine. The bearing system may be easily manufactured at low cost and provide a total bearing system that may be inserted easily into a machine, thus providing inexpensive manufacture, repair, and maintenance of the machine. The outer race of the bearing system may be manufactured from steel and adapted to rotate within stationary machine elements of either cast aluminum or cast iron.

While I have shown and described a preferred embodiment of the invention, other embodiments may be devised without departing from the spirit and scope of the following claims.

I claim:

1. A bearing system for a rotating shaft, characterized in that said bearing system includes:
   a full-floating sleeve bearing (14) having a bearing surface adapted to rotatably carry the rotating shaft (20) at one end of the bearing system,
   an inner race (16a) adapted to be fastened to the rotating shaft at the other end of the bearing system, and
   an outer race (12) extending axially of the rotating shaft being adapted at said other end of the bearing system to cooperate with the inner race and a plurality of interposed rolling elements (16b) and to form an anti-friction bearing at said other end of the bearing system, the inner surface (12b) of the outer race (12) expanding from said one end to the other end and the outer surface (12a) of the outer race (12) forming an elongated cylindrical bearing surface and radially extending thrust-bearing surfaces (12c, 12d),
   said sleeve bearing (14) including a passageway (14b) permitting lubricating fluid to be introduced into the bearing system at the bearing surfaces of the sleeve bearing, said lubricating fluid introduced to the sleeve bearing and escaping therefrom being urged by rotation of the outer race to lubricate the rolling elements of the anti-friction rolling bearing.

2. The bearing system of claim 1 characterized in that said radially extending thrust-bearing surfaces are a pair of spaced surfaces (12c, 12d) extending perpendicularly from its cylindrical bearing surface to provide a pair of thrust-bearing surfaces which are rotatable with said outer race.

3. A bearing system for carrying a shaft rotating at high speed within a stationary machine support, characterized in that said bearing system includes:
   a sleeve bearing (14) forming an inner bearing surface to carry the rotating shaft on a film of lubrication,
   an inner race (16a) adapted to cooperate with a plurality of ball bearings and to be fixed to the rotating shaft (20),
   a plurality of ball bearings (16b), and
   an outer race (12) adapted at one end to cooperate with the sleeve bearing (14) and adapted at the other end to cooperate with the ball bearings and inner race to form a ball bearing support for the shaft, the outer race (12) having an outer bearing surface (12a) and radially extending bearing surfaces (12c, 12d) adapted to be rotatably carried on a film of lubrication by the stationary machine support (32) and bear thrust imposed on said shaft,
   said bearing system being free to move radially in the machine support in response to imbalance and to rotate within the machine support at a fraction of the speed of shaft rotation.

4. The bearing system of claim 3 characterized in that the bearing system provides support at two longitudinally separated places on the rotating shaft, the outer bearing surface (12a) of the outer race (12) being a long cylinder and the inner surface (12b) of the outer race (12) expanding from the one end adjacent the sleeve bearing to the other end adjacent the ball bearings (16b).

5. The bearing system of claim 3 characterized in that the inner race (16a) and the plurality of ball bearings (16b) are included in a conventional ball bearing mounted in the outer race (12).

6. The bearing system of claim 4 characterized in that the machine support (32) provides a flow of lubricant to the outer bearing surface (12a) of the outer race (12), and further characterized in that the sleeve bearing (14) has a passageway (14b) providing a flow of lubricant to the inner surface of the sleeve bearing and the inner surface of the outer race (12) delivers a flow of lubricant to the ball bearing (16, 140).

7. The bearing system of claim 3 chracterized in that the outer bearing surface (12a) of the outer race (12) has two transversely extending, spaced surfaces (12c, 12d) at the end adjacent the inner race (16a) and ball bearings (16b) to provide a pair of thrust-bearing surfaces for the bearing system, the machine support (32) provides a flow of lubricant to the outer bearing surface (12a) of the outer race (12) and one of the thrust-bearing surfaces formed by one transversely extending surface (12c) and in that the bearing system has a passageway (14b) to provide a flow of lubricant first to the inner surface of the sleeve bearing (14), then to the ball bearings (16b), and then to the other transversely extending thrust-bearing surface (12d).

8. An insertable bearing support system for a high-speed rotating shaft, characterized in that said bearing support system includes:
   a rotatable elongated outer race (12) forming an outer bearing surface including an elongated, axially extending cylindrical bearing surface portion (12a) and a pair of transversely extending, thrust-bearing surfaces (12c, 12d),
   a sleeve bearing (14) adjacent one end of the outer race (12) to rotatably support the rotating shaft (20) adjacent said one end of the outer race (12), and
   an inner race (16a) and a plurality of rolling elements (16b) at the other end cooperating with the inner surface (12b) of the outer race (12) to rotatably support the rotating shaft at the other end,
   said bearing system being thereby adapted to be inserted from one end of said rotating shaft and to provide bearing support at spaced locations on the rotating shaft and thrust bearings.

9. The insertable bearing of claim 8 characterized in that the sleeve bearing (14) has a passageway (14b) for delivery of lubrication to the inner surface of the sleeve bearing and in that the inner surface (12b) of the outer race is adapted to deliver lubrication from the sleeve bearing to the rolling elements.

10. A bearing system for a rotating shaft, characterized in that said bearing system includes:
    an independent outer race (12) adapted to be rotatable in its support (32) and carried on a film of lubricant and to provide a thrust bearing and a rolling bearing (16, 140) at one end of the outer race, said independent outer race having an elongated cylindrical bearing surface (12a) and radially extending bearing surfaces (12c, 12d), and
    an independent floating sleeve bearing adapted to cooperate with said rolling bearing and outer race adjacent the other end of the outer race.

11. The bearing system of claim 10 characterized in that said support (32) comprises a stationary machine element (32), said bearing system being adapted to be insertable into said stationary machine element (32) and to rotatably support the shaft (20) and characterized in that the sleeve bearing and rolling bearing are separated longitudinally to provide spaced support for the shaft, and the sleeve bearing (14) includes a passageway (14b) to provide a flow of lubrication to the sleeve bearing (14) and the inner surface (12b) of the outer race (12) provides a flow of lubricant from the sleeve bearing (14) to the rolling bearing (16, 140).

12. The bearing system of claim 10 characterized in that said system is adapted to support a rotating shaft extending within a machine from one end exposed to hot gas to a cooler end, and further characterized in that the sleeve bearing (14) is located by the bearing system adjacent the end of the machine exposed to hot gas and is free to rotate at speeds 0.4 to 0.5 times the speed of the rotation of the rotating shaft and the rolling bearing (16, 140) is located by the bearing system adjacent the cooler end of the machine.

13. The bearing system of claim 10 characterized in that the outer race (12) includes outwardly projecting surfaces (12c, 12d) and forms a thrust bearing at its end adjacent the cooler end of the machine.

14. The bearing system of claim 10 characterized in that the outer race (12) is adapted to cooperate with its support to permit radial movement in response to imbalance in the system it carries and to permit axial expansion of the rotatable shaft in the sleeve bearing and to provide axial bearing support.

15. The bearing system of claim 10 characterized in that the rolling bearing is conventional ball bearing (140) carried by the outer race.

16. The bearing system of claim 10 characterized in that the outer race (12) is adapted to coact with its support to rotate at a speed of less than one-third the speed of rotation of the rotating shaft and the floating sleeve bearing is free to rotate at 0.4 to 0.5 times the speed of rotation of the rotating shaft.

17. The bearing system of claim 16 characterized in that the outer race (12) has a pair of outwardly projecting thrust-bearing surfaces (12c, 12d) at its end adjacent the rolling bearing, and characterized in that the elongated cylindrical outer bearing surface and support are adapted to provide a lubricating film having an average thickness of from about 0.0051 cm. to about 0.0102 cm., and the outer race rotates at about one-tenth the speed of rotation of the rotating shaft.

18. A bearing system adapted to carry a shaft rotating at high speed within stationary machine support, characterized in that said bearing system includes:
an elongated outer race (118) carrying a rolling bearing (110, 120) adjacent each end and having radially extending portions forming thrust bearings, said elongated outer race being adapted to rotate within the stationary machine support (130) at a fraction of the speed of the shaft rotation and to move radially in the machine support in response to imbalance.

19. The bearing system of claim 18 characterized in that the outer race (118) has a pair of spaced thrust-bearing surfaces extending normal to the axis of rotation in parallel planes, the rolling bearings are ball bearings, and the outer race and stationary machine element interact to limit the speed of rotation of the outer race to less than about one-third the speed of the rotating shaft.

20. A bearing system for carrying a rotating shaft within a machine support, characterized in that said bearing system includes:

first bearing means for providing a bearing support for said rotating shaft at a first location on said shaft;
second bearing means for providing a bearing support for said rotating shaft at a second location on said shaft spaced from said first location,
said first bearing means comprising a first anti-friction roller bearing means including an inner race engaging said shaft, an outer race, and a plurality of roller bearings interposed between said inner race and said outer race, said outer race extending axially from said first location to adjacent said second location of said rotating shaft, said outer race having an outer bearing surface and radially extending thrust bearing surfaces adapted to be rotatably carried by said machine support, said bearing system being free to rotate within the machine support at a fraction of the speed of shaft rotation.

21. The bearing system of claim 20 characterized in that said second bearing means comprises a sleeve bearing having an inner bearing surface adapted to rotatably carry said rotating shaft at said second location, said sleeve bearing being free to rotate independently within the machine support.

22. The bearing system of claim 21 characterized in that said outer bearing surface of said outer race forms an elongated, cylindrical bearing surface, and in that said outer race includes an inner surface which expands in diameter from one end thereof adjacent said sleeve bearing to the opposite end thereof adjacent said roller bearings.

23. The bearing system of claim 21 characterized in that the outer bearing surface of the outer race has two transversely extending, spaced surfaces at the end adjacent the inner race and roller bearings to provide a pair of thrust-bearing surfaces for the bearing system, in that the machine support includes means for providing a flow of lubricant to the outer bearing surface of the outer race which also lubricates one of the thrust-bearing surfaces formed by one transversely extending surface and in that the bearing system has means to provide a flow of lubricant first to the inner surface of the sleeve bearing, then to the roller bearings, and then to the other transversely extending thrust-bearing surface.

24. The bearing system of claim 21 characterized in that said rotating shaft extends within a machine from one end exposed to hot gas to a cooler end, and further characterized in that the sleeve bearing is located by the bearing system adjacent the end of the machine exposed to hot gas and is adapted to rotate at a speed of about 0.4 to 0.5 times the speed of the rotation of the rotating shaft, and in that the roller bearing means is located by the bearing system adjacent the cooler end of the machine and the outer race is adapted to rotate at a speed of about one-third to about one-tenth of the speed of the rotation of the rotating shaft.

25. The bearing system of claim 20 characterized in that said second bearing means comprises a second anti-friction roller bearing means having an inner race and a plurality of roller bearings cooperating with said outer race, and further characterized in that said outer race carries said roller bearings adjacent each end thereof.

26. The bearing system of claim 25 characterized in that the outer race has a pair of spaced surfaces extending normal to the axis of rotation in parallel planes, the rolling bearings comprise ball bearings, and the outer race and machine element interact to limit the speed of rotation of the outer race to less than about one-third the speed of the rotating shaft.

* * * * *